(12) United States Patent
Jacobson et al.

(10) Patent No.: US 11,140,103 B2
(45) Date of Patent: Oct. 5, 2021

(54) COMPUTERIZED SYSTEM AND METHOD FOR OPTIMIZING DELIVERY OF DIGITAL MESSAGES

(71) Applicant: VERIZON MEDIA INC., New York, NY (US)

(72) Inventors: Joshua Robert Russell Jacobson, San Francisco, CA (US); Marcel Becker, San Jose, CA (US); Ilana Walder-Biesanz, Stanford, CA (US)

(73) Assignee: VERIZON MEDIA INC., New York, NY (US)

( * ) Notice: Subject to any disclaimer, the term of this patent is extended or adjusted under 35 U.S.C. 154(b) by 93 days.

(21) Appl. No.: 16/370,909

(22) Filed: Mar. 30, 2019

(65) Prior Publication Data
US 2020/0314042 A1    Oct. 1, 2020

(51) Int. Cl.
| | |
|---|---|
| G06F 15/16 | (2006.01) |
| H04L 12/58 | (2006.01) |
| H04L 29/08 | (2006.01) |
| G06Q 30/02 | (2012.01) |
| G06F 40/211 | (2020.01) |

(52) U.S. Cl.
CPC ......... H04L 51/046 (2013.01); G06F 40/211 (2020.01); G06Q 30/0281 (2013.01); H04L 67/306 (2013.01)

(58) Field of Classification Search
None
See application file for complete search history.

(56) References Cited

U.S. PATENT DOCUMENTS

| | | | | |
|---|---|---|---|---|
| 2008/0222283 A1* | 9/2008 | Ertugrul | ................. | G06Q 30/02 709/224 |
| 2010/0161734 A1* | 6/2010 | Wang | ...................... | H04L 51/28 709/206 |
| 2013/0097269 A1* | 4/2013 | Plotkin | ............. | H04M 1/72547 709/206 |
| 2014/0279624 A1* | 9/2014 | Liu | ......................... | G06F 21/62 705/319 |
| 2014/0282003 A1* | 9/2014 | Gruber | .................... | G06F 3/167 715/727 |
| 2015/0033141 A1* | 1/2015 | Mishra | .................... | H04L 51/22 715/752 |
| 2015/0073895 A1* | 3/2015 | Karnin | .................... | H04L 51/22 705/14.49 |

(Continued)

*Primary Examiner* — Phuoc H Nguyen
(74) *Attorney, Agent, or Firm* — James J. DeCarlo; Greenberg Traurig, LLP (57) ABSTRACT

Disclosed are systems and methods for improving interactions with and between computers in content providing, searching and/or hosting systems supported by or configured with devices, servers and/or platforms. The disclosed systems and methods provide a framework for delivering electronic messages to a recipient in an optimized manner based on current real-world and digital activities associated with the recipient. Once a message sent by a sender is received by the message platform, the message and information related to a user's activity is analyzed, and a delivery condition is determined by the messaging platform. The platform then sends the message according to that delivery condition, such that it is delivered to the user only upon the platform relaying the message thereon when the condition is satisfied or occurs.

13 Claims, 5 Drawing Sheets

(56) References Cited

U.S. PATENT DOCUMENTS

| | | | |
|---|---|---|---|
| 2017/0099592 A1* | 4/2017 | Loeb | G06Q 10/107 |
| 2017/0200015 A1* | 7/2017 | Gonzalez | G06F 21/552 |
| 2018/0048595 A1* | 2/2018 | Dotan-Cohen | H04L 51/08 |

* cited by examiner

COMPUTERIZED SYSTEM AND METHOD FOR OPTIMIZING DELIVERY OF DIGITAL MESSAGES

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of network based computerized content hosting and providing devices, systems and/or platforms by modifying the capabilities and providing non-native functionality to such devices, systems and/or platforms through a novel and improved framework for a messaging platform to optimize delivery messages to a recipient based on proprietary user data hosted by the messaging platform.

BACKGROUND

Entities that send electronic mail (email) to users want those messages to be opened by those users. However, many of these emails are never opened, and they are often deleted without the recipient user ever seeing what is included in the received message.

Some conventional systems enable senders of emails to set the time, date and/or place when specific messages are delivered to recipient users. This a form of traditional "conditional delivery" of messages. For example, a sender may want a recipient to receive a message in four hours. In this case, for example, the sender drafts and sends the message to the user, which is received and held by a messaging server, and then is only delivered to the recipient after four hours has passed. However, these forms of message delivery are strictly based on instructions set by the sender.

In some situations, the sender may be privy to data about the recipient user, which can be provided by a messaging platform. For example, if the sender is a third party advertiser (or marketer), the sender may receive suggested times, dates or locations about a user, which the sender can leverage in order to ensure that their content is received at alleged opportune times, dates or locations. Again, the messages being sent are delivered based solely on sender provided instructions.

Moreover, in addition to the privacy concerns with third parties receiving and being granted access to user's data, these types of systems are not solving the current problems with email overload and fatigue that many systems are currently facing. That is, as the usage of email has become ubiquitous for both personal and commercial reasons, an increasing array of alternative sending methods are being used, which are simply leading users to delete the messages from "not known" senders in bulk. Even when the senders are receiving user data about the users, this data is not up-to-date (or current), nor is it the complete picture of a user's online and real-world persona or activity. Thus, present systems are sub-optimal.

SUMMARY

There is a need for a message delivery system that relies on and/or implements conditional message delivery functionality from the standpoint of the messaging server, platform or host, such that the delivery can be optimized according to both the recipient user's and sending user's standpoint. The disclosed systems and methods provide a technical solution to such existing technical problems, especially those highlighted above, by providing a novel framework for delivering electronic messages to a recipient in an optimized manner based on current real-world and digital activities associated with the recipient.

According to some embodiments, rather than having the sender set the conditions for a message's delivery, as in conventional systems, the disclosed framework relies upon the messaging platform to determine when is the opportune moment for a message to be delivered. Allowing a messaging platform (or messaging provider and/or client software publisher, like for example, Verizon® or Google®) to understand the best timing to deliver a communicated message will result in the most optimal open-rate, as the platform can leverage a number of factors that are not known to the message sender. In some embodiments, the messaging platform can charge a sender a fee for optimized delivery, as the open-rate of these types of messages will increase.

Therefore, the disclosed systems and methods reliance on a message platform's (e.g., message server) functionality to determine when a message should be delivered has many technical benefits. First, and possibly foremost, recipient users' privacy levels are fully maintained, as senders will not be provided access to their data for purposes of sending messages. Further, while users can receive the same amount of messages (e.g., no more or less), they will receive them at different times, which will lead to more opportunities for them to discern their importance (e.g., open them and then act accordingly). And, while a sender can pay for an improved delivery scheme, their delivery rate remains unchanged.

As discussed herein, reference to "messages" can be any type of message that is receivable within any known or to be known messaging or email system. For purposes of this disclosure, reference will be made to electronic mail (email); however, it should not be construed as limiting, as any form of messages can be utilized without departing from the scope of the instant disclosure. The message content comprised within such messages can be any type of message content, such as, but not limited to, text, audio, video, graphics interchange format (GIF) files, digital advertisements, and/or any other type of known or to be known multimedia, or some combination thereof.

In accordance with one or more embodiments, the instant disclosure provides computerized methods for a novel framework for delivering electronic messages to a recipient in an optimized manner based on current real-world and digital activities associated with the recipient. In accordance with one or more embodiments, the instant disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, email server, ad server, content server and/or client device, and the like) cause at least one processor to perform a method for a novel and improved framework for delivering electronic messages to a recipient in an optimized manner based on current real-world and digital activities associated with the recipient.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The instant disclosure provides improved systems and methods for processing and delivering messages in an optimized manner via a messaging system. The disclosed systems and methods provide for a message sent by a sender to be delivered according to conditions determined by the messaging platform being used to send the message. This enables the platform to unilaterally determine when, where and how the message is delivered to the recipient.

According to embodiments of the instant disclosure, when a message is sent to a recipient over a messaging platform, the message platform's server (e.g., messaging server 120, as in FIG. 1) receives the message from the sender and determines a context of the message. The server then analyzes user data about the recipient that is proprietary to the platform. The analysis that occurs involves determining a delivery condition(s) for the message based on real-world and digital activities of the recipient (e.g., derived or identified from the recipient's user data) that corresponds to the context of the message. This enables the server to determine when is the optimal timing for the message's delivery to the recipient. The message is stored in a datastore (or database) associated with the server until its ultimate delivery to the recipient, which occurs when the delivery condition(s) is satisfied.

Thus, rather than a sender setting conditions for a message's delivery, as in conventional systems, the disclosed framework provides functionality to the messaging server handling the delivery of the messages to dictate when, where and how such messages are delivered to a recipient's inbox.

According to some embodiments, the user data the messaging server leverages in order to determine the optimal timing of a message's delivery is based on information that is determined, identified, derived and/or hosted by the server's platform. For example, a messaging server for email provider Yahoo! Mail® can host information indicating a user's past, present and/or future real-world and virtual (e.g., digital) information, which can be stored in an associated database (e.g., database 320, as discussed below). Such information can include, but is not limited to, biographical information, demographic information, which applications the user is using on his/her device(s), types and/or timing of a user's online and/or real-world behavior (e.g., when a user is typically on his/her device and therefore more likely to see new incoming messages), and the like, as discussed below in FIGS. 3 and 4.

By way of a non-limiting example, according to some embodiments of the present disclosure, sender X is a marketer specializing in providing users with promotions for electronic equipment (e.g., TVs, appliances and the like). Sender X wants to send user Y an email indicating that Black Friday deals at store Z begin on 6 pm Thanksgiving Day. Sender X sends the email on the Monday of Thanksgiving week.

According to some embodiments of the instant disclosure, the messaging server receives this message from sender Y. Upon reception by the server, the message is analyzed and the context of the message is determined. The context indicating, for example, "Black Friday deals for electronic appliances."

The server, upon receiving the message and determining the context, analyzes the user data of user Y, which as discussed above, is hosted by the platform the server is operating (e.g., Yahoo! Mail® platform). The user data indicates user Y's biographic, demographic, and real-world and digital behaviors. The server analyzes this information based on the context of the message, and determines that the optimal time to deliver the message to the user is the morning of Thanksgiving Day at 9 am (e.g., where the time of day is typically when a user opens his mail app on days she is off from work).

For example, the server identifies that user Y is travelling to/from the airport the day prior to Thanksgiving Day to pick up relatives—this is activity is derived from emails in the user's inbox and the user's calendar information—therefore, delivery of the message on the day before Thanksgiving Day would most likely lead to the user not reading/seeing this email.

The server then stores the message in storage for later delivery, and such storage can involve annotating the storage of the message with a condition value that indicates when delivery is to be triggered. Therefore, when the morning of Thanksgiving Day arrives (e.g., 9 am on Nov. 28, 2019), the message is located in storage, retrieved and then delivered to an inbox of user Y. In some embodiments, the message can be delivered after a predetermined lag time—for example, 1 second after the mail app is opened on Thanksgiving Day, so that the user is actually viewing his/her inbox as the message is populated within the inbox.

According to some embodiments, the disclosed systems and methods can be performed for only senders (e.g., marketers, advertisers or other forms of third parties) that are authenticated with the messaging platform. That is, only senders that have a confirmed subscription status can utilize the capabilities of having the platform conditionally delivery messages for the sender according to the disclosed capabilities. In some embodiments, the subscription status can be based on a recipient subscribing to a sender, and in some embodiments, the subscription status can be based on the sender subscribing to the delivery service being provided by the email platform.

According to some embodiments, the disclosed framework safeguards against recipient user's receiving too many marketing emails at the same time, or within the same time period. For example, a set of messages are determined to have the same optimal delivery timing; however, the number of messages in the set is more than an assigned threshold set by the platform. Therefore, the platform can adjust a sub-set of messages' timing so that the user is not receiving more than a threshold number of marketing messages at a specific time, or during a timing window.

In some embodiments, even though user data is not being provided to the third party senders, the messaging platform may provide the senders information indicating analytics about message open rates, which can indicate delivery methods for messages (e.g., delivered while a user was in his/her inbox, delivered while a user was in his/her mail app, delivered while a user was on his/her device, delivered at a specific time, and the like).

In some embodiments, as discussed below, a marketer's email typically includes information indicating a date or date range by which a sent email is requested to be sent to a recipient. In some embodiments, should the disclosed framework determine that the optimal time to send the message to the recipient be outside the sender's requested window, then the message will be set to be sent at the end of the date range provided by the sender.

As discussed in more detail below at least in relation to FIG. 5, according to some embodiments, information associated with, derived from, or otherwise identified from, during or as a result of the message delivery, as discussed herein, can be used for monetization purposes and targeted advertising when providing, delivering or enabling such devices access to content or services over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Figure 1:
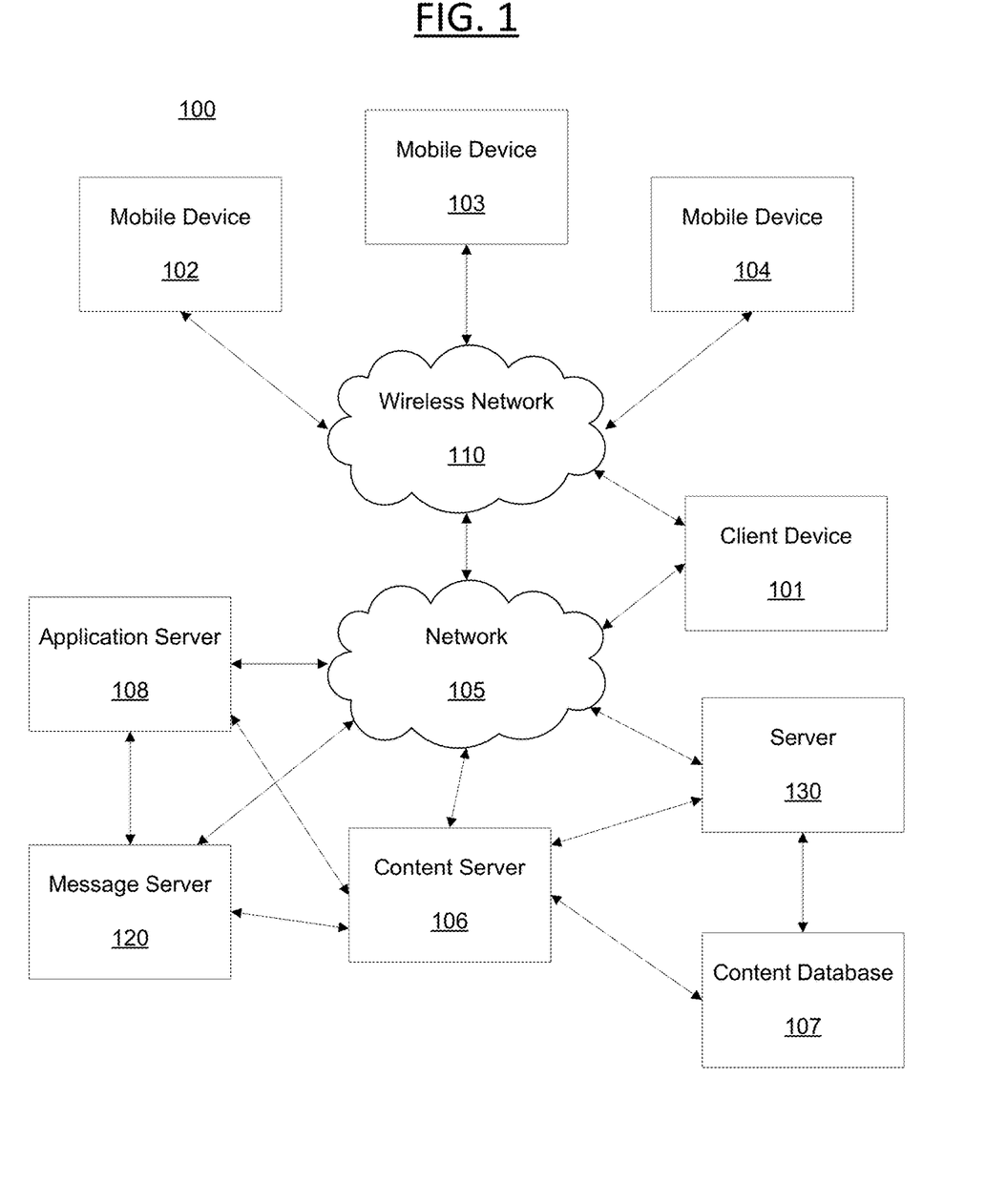
FIG. 1 is a schematic diagram illustrating an example of a network within which the systems and methods disclosed herein could be implemented according to some embodiments of the present disclosure.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, message server 120 and third party server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

Third party server 130 can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as a mail application (e.g., Yahoo! Mail®, Gmail®, and the like), instant messaging application, blog, photo or social networking application (e.g., Facebook®, Twitter® and the like), search application (e.g., Yahoo!® Search), and the like, can be hosted by the application server 108, message server 120, or content server 106 and the like.

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108 and/or 130 may be integrated into a single computing device, without departing from the scope of the present disclosure.

Figure 2:
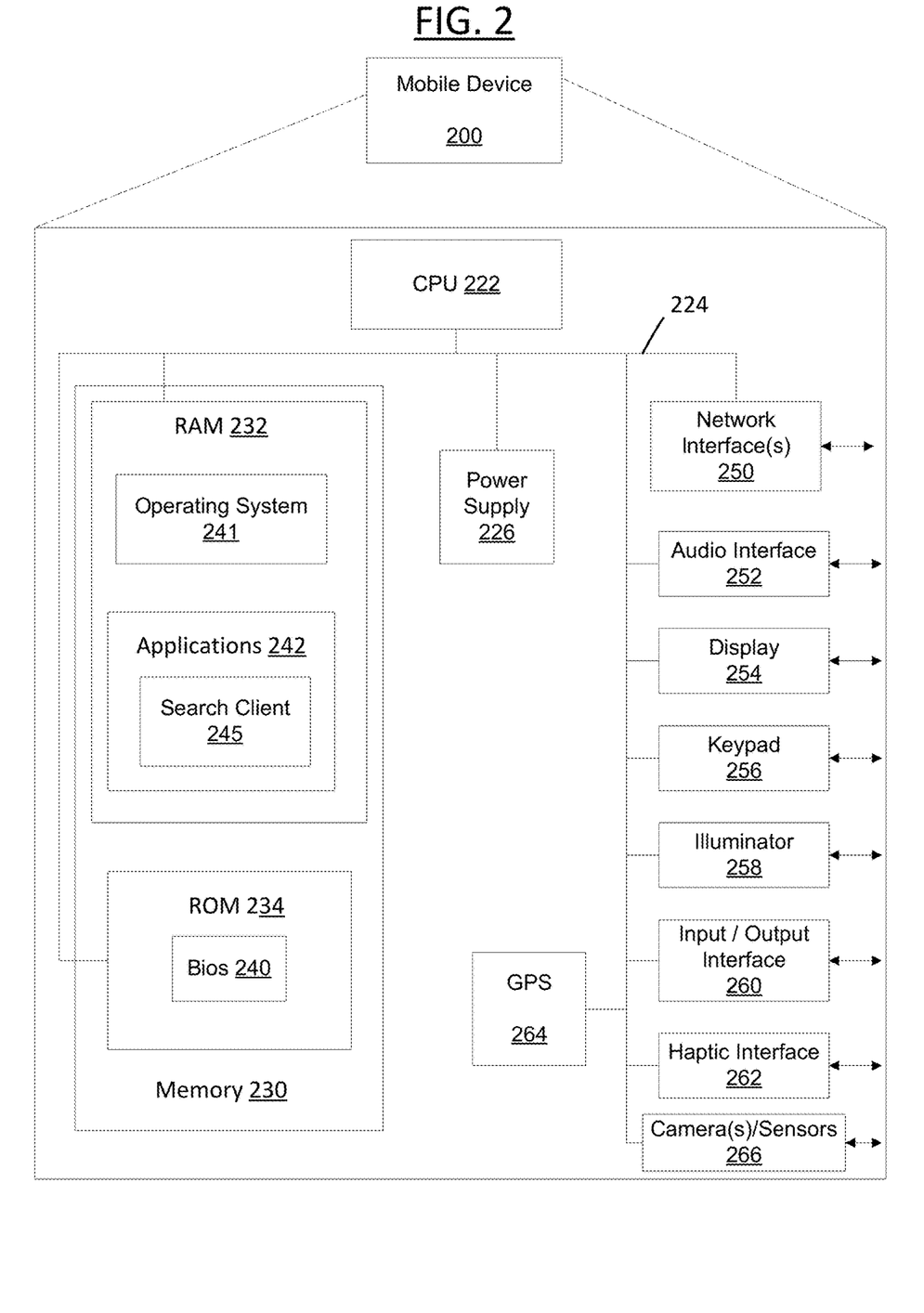
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200.

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below with reference to FIGS. 3-6.

Figure 3:
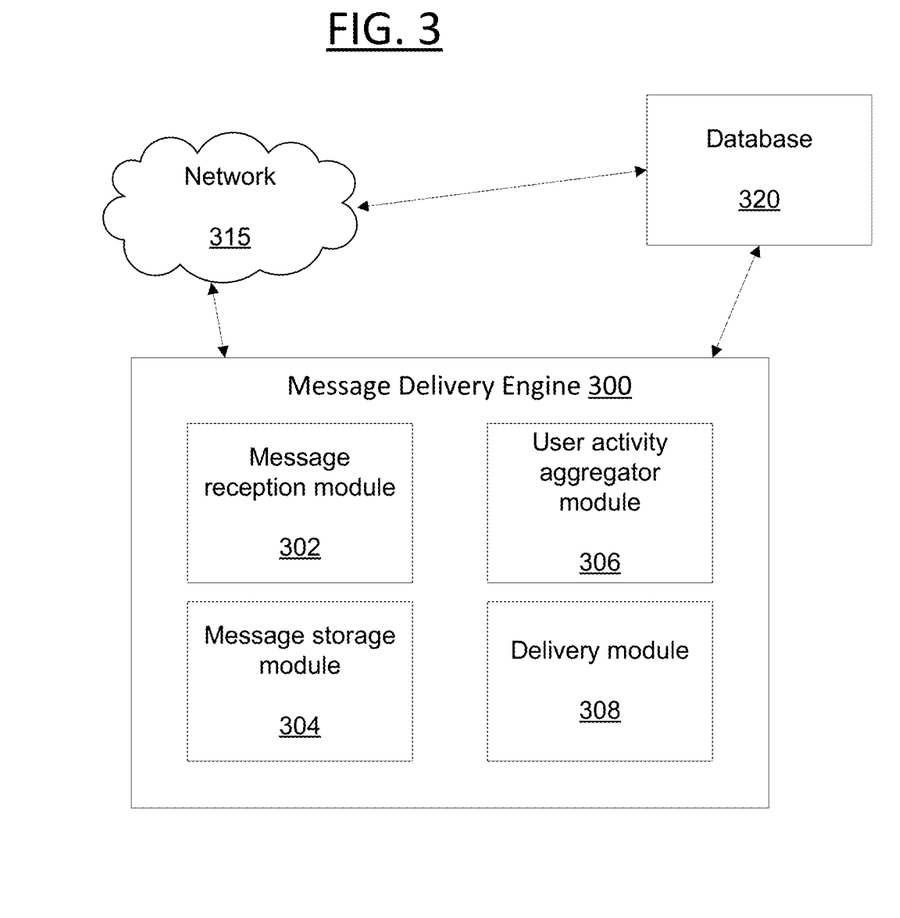
FIG. 3 is a block diagram illustrating components of an exemplary system in accordance with embodiments of the present disclosure.

FIG. 3 is a block diagram illustrating the components for performing the systems and methods discussed herein. FIG. 3 includes message delivery engine 300, network 315 and database 320. The message delivery engine 300 can be a special purpose machine or processor and could be hosted by an application server, content server, social networking server, web server, email server, search server, content provider, third party server, user's computing device, and the like, or any combination thereof.

According to some embodiments, message delivery engine 300 can be embodied as a stand-alone application that executes on a user device. In some embodiments, the message delivery engine 300 can function as an application installed on the user's device, and in some embodiments, such application can be a web-based application accessed by the user device over a network. In some embodiments, the message delivery engine 300 can be installed as an augmenting script, program or application (e.g., a plug-in or extension) to another application (e.g., Yahoo! Mail®).

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with a user from an assortment of media and/or service providers and/or platforms. For example, the information can be related to, but not limited to, content type or category, information associated with the sender or recipient(s) of a message, information associated with content included in a message, and any other type of known or to be known attribute or feature associated with a message or content of a message, or some combination thereof.

According to some embodiments, information related to, derived from or otherwise determined from analysis of messages addressed to and/or hosted within a user's inbox can be stored in database 320 as n-dimensional vector (or feature vector), where the information associated with each message can be translated as a node on the n-dimensional vector for an inbox. In some embodiments, each message can have its own vector where the information included therein can be represented by the nodes on a respective vector. In some embodiments, as messages are sent/received, detected and/or tracked, information corresponding thereto can also be stored in the database 320 in a similar manner.

Database 320 can store and index inbox/message information in database 320 as linked set of inbox/message data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. It should be understood that any known or to be known computational analysis technique or algorithm, such as, but not limited to, cluster analysis, data mining, Bayesian network analysis, Hidden Markov models, artificial neural network analysis, logical model and/or tree analysis, and the like, and be applied to determine, derive or otherwise identify vector information for messages within an inbox.

For purposes of the present disclosure, as discussed above, messages (which are stored and located in database 320) as a whole are discussed within some embodiments; however, it should not be construed to limit the applications of the systems and methods discussed herein. That is, while reference is made throughout the instant disclosure to messages (e.g., email messages or other forms of electronic messages), other forms of messages (e.g., social media messages, Instant Messages (IMs)) and other mediums that display digital content information in whole or in part (e.g., a map), and the content included therein, including, text, audio, images, multimedia, RSS feed information, can be used without departing from the scope of the instant application, which can thereby be communicated and/or accessed and processed by the message delivery engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the message delivery engine 300, and the database of stored resources 320. Indeed, as illustrated in FIG. 3, the message delivery engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as message delivery engine 300, and includes message reception module 302, message storage module 304, user activity aggregator 306 and delivery module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
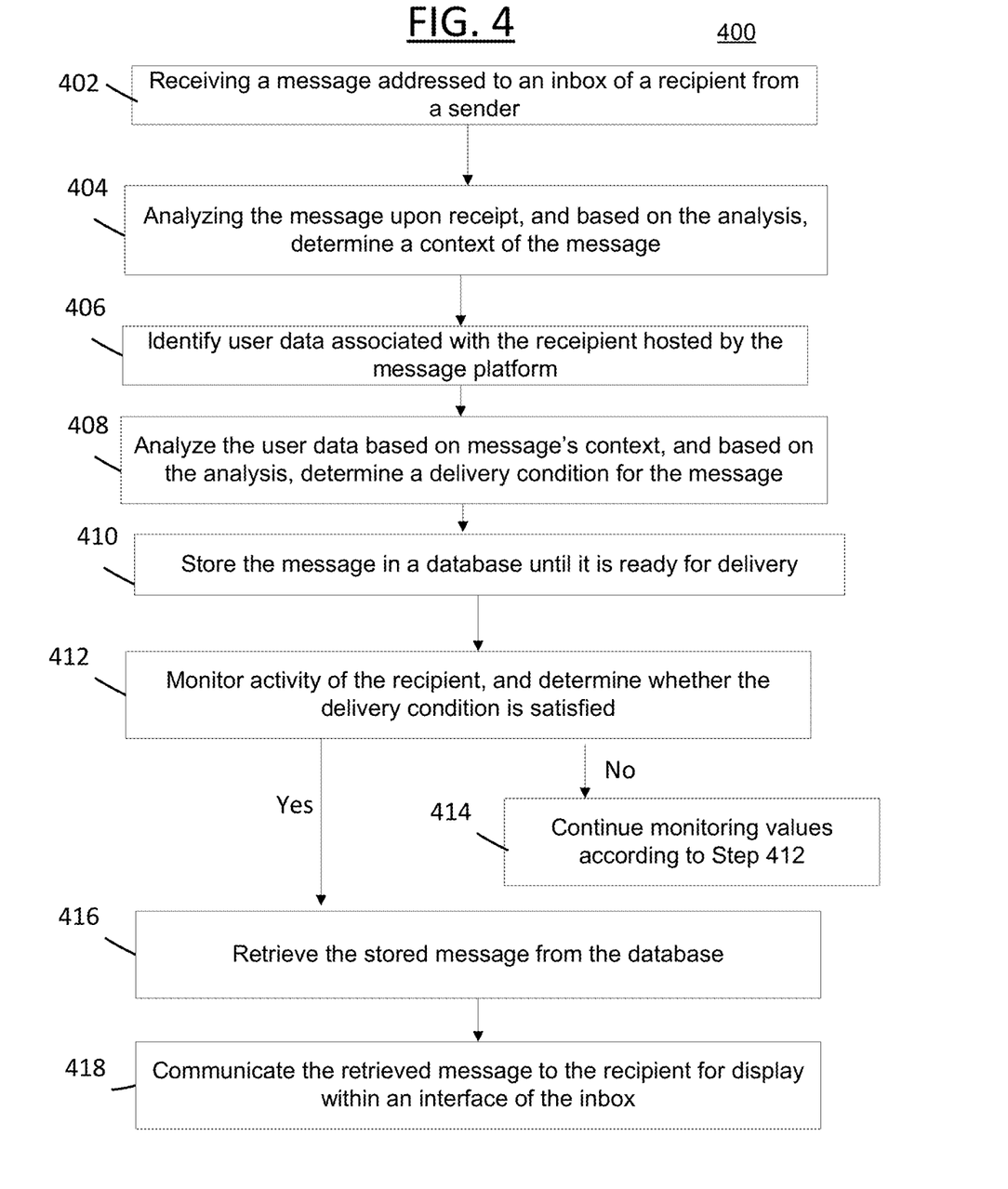
FIG. 4 is a schematic diagram illustrating components of an exemplary system in accordance with embodiments of the present disclosure.

Turning to FIG. 4, Process 400 provides an example data flow that details embodiments of the disclosed framework for delivering electronic messages to a recipient in an optimized manner based on current real-world and digital activities associated with the recipient. As discussed herein in more detail, once a message sent by a sender is received by the message platform, the message and information related to the recipient user's activity is analyzed, and a delivery condition for the message is determined by the messaging platform. The platform then sends the message according to that delivery condition, such that it is delivered to the user only upon the platform relaying the message in compliance with the condition (e.g., time, date and/or location value).

According to some embodiments of Process 400 of FIG. 4, Steps 402-404 of Process 400 are performed by the message reception module 302 of the message delivery engine 300; Steps 406-408 are performed by the user activity aggregator module 306; Step 410 is performed by the storage module 304; and Steps 412-416 are performed by the delivery module 308.

Process 400 beings with Step 402 where an incoming message sent by a sender and addressed to an inbox of a recipient user is received by a server (e.g., messaging server 120). In some embodiments, Step 402 and the subsequent steps of Process 400 can be performed for each incoming message addressed to a recipient's inbox. The messages identify the recipient and include content, and in some embodiments, can include a sender requested delivery date, which can be a date range for delivery or a time-stop by which delivery is requested to have occurred.

In some embodiments, a message can have information included therein, or accompanying it, that indicates that the message is being sent by an entity from which the recipient has subscribed. For example, a user has signed up to receive promotional emails from Macy's®. Therefore, according to embodiments of the instant disclosure, the information indicates that the message is being requested to be conditionally delivered by the platform, whereby the steps of Process 400 are triggered.

Thus, Step 402 can involve analyzing the message for such type of information in order to proceed to Step 404. Identification of this request causes the messaging server 120 to execute the steps of Process 400, which results in the sender being charged an additional fee, which is specific to the conditional delivery processing and occurrence discussed herein. For example, marketers can be charged a premium for the mail delivery service disclosed herein, but would not be if they did not include such delivery request with their sent mail. Thus, absent the delivery request, a sent message will be sent as a "normal message" free of charge—i.e., messages that are delivered immediately after they are sent.

In some embodiments, as understood by those of skill in the art, the steps of Process 400 can be performed by messages already delivered to the inbox of the message, whereby the server is mining the inbox for past messages that can be resurfaced in a user's inbox (e.g., redelivered and/or marked as "unopened" to draw the user's attention to them at the optimal timing). While the focus of the discussion herein will focus on incoming messages, one of skill in the art would understand that such mining for messages can be embodied through execution of the steps of Process 400 without departing from the scope of the instant disclosure.

In Step 404, the received message is analyzed by engine 300 executing on the server, and based on the analysis, the context of the message is determined, derived or otherwise identified. As understood by those of skill in the art, the context can be a summary of the message, keywords extracted from the message, or other forms of digital information that indicate and/or represent the data included within the message.

In some embodiments, the incoming message and/or a set of messages (e.g. a message thread) analyzed by Process 400 can be a message(s)s addressed to the user's inbox. The identification of the messages can be based on criteria such that only a set of all the messages in the inbox are identified.

According to some embodiments, such criteria can reference a type of message (e.g., personal or commercial messages), the type of content included in the message (e.g., text, audio, video, multi-media, and the like), a context of the message (e.g., is the message related to a promotion, purchase receipt, expiring deal, future activity, and the like), a time period, location associated with a message(s) (e.g., where was the message sent from, what location does the message reference, where was the message received, and the like), an identity of a sender, other recipients of a message (e.g., if it was a group message), which platform the message originated from (e.g., was it a message from another messaging platform), is the message unread, was the message acted upon (e.g., was it forwarded, responded to, saved, categorized or deleted), how was the message checked/read (e.g., did the user open and read the message from an application on his/her mobile device), how often or recent (compared to a threshold) did the user contact or receive correspondence from the sender/recipient, did the user sign up for or subscribe to messages from that sender (as discussed above), and the like, or some combination thereof.

Therefore, according to some embodiments, Step 404 can involve analyzing received or incoming messages according to the criteria and identifying a message set (e.g., a single message or a plurality of messages) that satisfy the criteria. This enables engine 300 to efficiently analyze and process a smaller set of messages, as those messages not satisfying the criteria are filtered out and automatically passed to the inbox without further processing, which alleviates the system from having to perform unnecessary analysis of certain types of messages (e.g., messages senders do not desire to have conditionally delivered or spam messages, and the like).

For example, Step 404 can involve determining that an incoming message is sent by a third party commercial sender that provides an email newsletter that the user has subscribed to. For example, a user receives 100 emails a day—therefore, engine 300 can identify a subset of those emails that are from commercial entities, thereby filtering out those messages that do not have a specific form of pertinent information—e.g., a coupon, deal or promotional information included therein.

According to some embodiments, Step 404 can involve engine 300 determining the context of the information referenced in the message based on language content in the message. In some embodiments, this can be focused on the plain text of the message, and in some embodiments, this can alternatively or additionally involve the text within multi-media portions of the message. In some embodiments, engine 300 may analyze the language content by executing software defined by a natural language processing (NLP) algorithm. An NLP algorithm, in one embodiment, can use probabilistic methods to identify one or more topics from the language content of the message. In some embodiments, engine 300 may search for keywords within the language content, the keywords being associated with particular topics.

In some embodiments, engine 300 can determine the context of the information referenced by the message based on a syntactic analysis or a sematic analysis of the language content of the message. The syntactic analysis may involve parsing the message into discrete components, such as clause or phrases, where each component has a central idea (e.g., a keyword). The semantic analysis may involve identifying the central idea of each discrete component identified through the syntactic analysis.

In some embodiments, the analysis of the messages by the engine 300 can involve the engine 300 implementing a parser on the backend in order to analyze the information (e.g., sender information, text, images, audio, video and/or multimedia) of the message. The parser can be responsible for extracting any relevant content from the message using natural language processing techniques, from which the context and message information can be determined, derived or otherwise identified.

In Step 406, the user data stored in database 320 for the recipient of the message is identified. As understood by those of skill in the art, an identifier of the recipient identified from the received message and is then utilized to search for and identify the user data for the recipient.

As discussed above, the user data for the recipient includes, but is not limited to, user interests, real-world and digital user behavioral information (past, present or future), user attributes, user preferences or settings, user demographic information, user location information (past, present or future), user biographic information, and the like, or some combination thereof. In some embodiments, the user data can also include user device information, including, but not limited to, device identifying information, device capability information, application information indicating which application are installed, running and/or being used currently by the user (and when, where and why they are being used), and/or any, or some combination thereof. The user data can be made up of historical data and/or real-time data that is currently being collected and/or monitored.

In Step 408, the user data of the recipient is analyzed, and such analysis can be based on the context of the message. That is, in some embodiments, the user data is parsed based on the context data, and information within the user data that corresponds to the context is identified. This provides an indication as to activity performed by the user and/or information about the user that relates to the context.

For example, if the message's context is related to "fishing", the user data related to when the user is proximate to or at an outdoor store (e.g., Bass Pro Shops®, for example) can be identified.

In some embodiments, the user data can be analyzed without reliance on the context data derived from Step 404. For example, the user data of the recipient indicates that the user typically opens his mail application every evening at 10 pm when she is at home.

Analysis of the user data, therefore, results in the determination of the delivery condition. That is, the analysis of the user data indicates a timing of when the user is most likely to interact with the message thereby leading to an increased open-rate for the message. The timing can be indicative of a time value, date value, location value, or some combination thereof.

For example, continuing with the above example, if a user receives a marketing email in the morning at 9 am, and is understood to read her emails at 10 pm when she is at home, then the delivery condition for the message will be set at 10 pm. In some embodiments, the delivery condition can also be tied to the user's home address, which can be identified by any form of location coordinates, such as, but not limited to, GPS data, latitude and longitude lines, and the like.

In Step 410, the message and the delivery condition are stored in database 320. The message and delivery condition are stored in association with one another such that when the message is retrieved, the conditional information for delivery can also be identified. Such storage can be based on a look-up table (LUT) or any other form of indexing of a database, as understood by those of skill in the art.

In Step 412, the activities of the recipient user are then monitored in order to determine when the delivery condition for the received, and now stored message are satisfied. The types of activity that can be tracked/monitored by engine 300 are similar to those activities that are identified in Step 406 and analyzed in Step 408 (e.g., user data of the recipient).

In some embodiments, the monitoring of the recipient's activity can be based on tracked real-world activity of the user. For example, real-world time, date and location information indicating where the user is, what the user's activity is, and a timing of such activity.

In some embodiments, the monitoring of the recipient's activity can be based on tracked digital activities of the user. For example, which applications the user is using, when and for how long they are/were opened, where, in the real-world, they were used, and other forms of online activity the user performs.

In some embodiments, engine 300 can request, ping, receive or otherwise avail itself of data concerning a recipient's device in order to track its real-world and/or digital activity. In some embodiments, the monitoring in Step 412 can be performed respective to the recipient's device periodically, or continuously, which can result in the device communicating data respective to its time, date and/or geographic locational values to the messaging server 120.

In some embodiments, Step 412 can involve parsing the data identified during the monitoring and searching for time, date, activity and/or location data that matches (in some embodiments to a threshold value) time, date, activity and/or location data of a stored message. If there is no match, then Process 400 proceeds to Step 414 and repeats Steps 412 as indicated in FIG. 4. If a match is determined in Step 412, then Process 400 proceeds to Step 416.

In Step 416, the stored message is retrieved from storage, and in Step 418 it is then automatically delivered to the recipient's device for display within an interface of the recipient's inbox. In some embodiments, as discussed above, a "lag" or "buffer" time may be added to the delivery in order to ensure that the recipient has time to open and/or view his/her inbox. For example, after determining that a delivery condition is satisfied, a 1 second delay may be instituted prior to the message's delivery, so that the user has time to open and view his/her inbox.

By way of a non-limiting example, for purposes of providing example embodiments of the disclosed systems and methods, user Bob signs up for email messages from Macy's®. The following Monday, at 6 am, Macy's sends it first message to user Bob, and the message has included therein instructions to deliver the message by 7 pm. Upon receiving the message, the server determines that Bob usually arrives at work on Monday at 8 am, and upon arriving at work, Bob opens his email application on his phone. Therefore, the delivery condition for the message is set accordingly.

In some embodiments, the delivery condition can be set for "8 am". In some embodiments, the delivery condition can be set for GPS coordinates for Bob's work location. In some embodiments, the delivery condition can be set for an instance of Bob opening his mail application on Monday. And, in some embodiments, the delivery condition can be any combination of the above—for example, {8 am, work GPS location, opening email application}, which indicates that after when Bob opens his email application, when at work, at least after 8 am, then the message is to be delivered.

In another non-limiting example, the delivery condition is set for {8 am, work GPS location, opening email application}, and Bob calls out sick that Monday. Therefore, the message would not typically be delivered that day. However, since this would cause the email to be delivered outside of the delivery request time period set by Macy's (7 pm on Monday), the message will be set to be delivered at the latest time possible within Macy's provided window—7 pm on Monday.

In some embodiments, despite Macy's request, the next time Bob is at work {8 am, work GPS location, on Tuesday, opening email application} can be set as the delivery condition for delivery of the message. In such situations, according to some embodiments, the current real-time data of the user (e.g., from Step 412) can cause the delivery condition to be modified since it becomes apparent that the message would not be delivered should the initial delivery condition maintain its original definitions. Therefore, in some embodiments, the delivery condition information stored in Step 410 would be modified, and the Process 400 would continue by utilizing the modified delivery condition.

Figure 5:
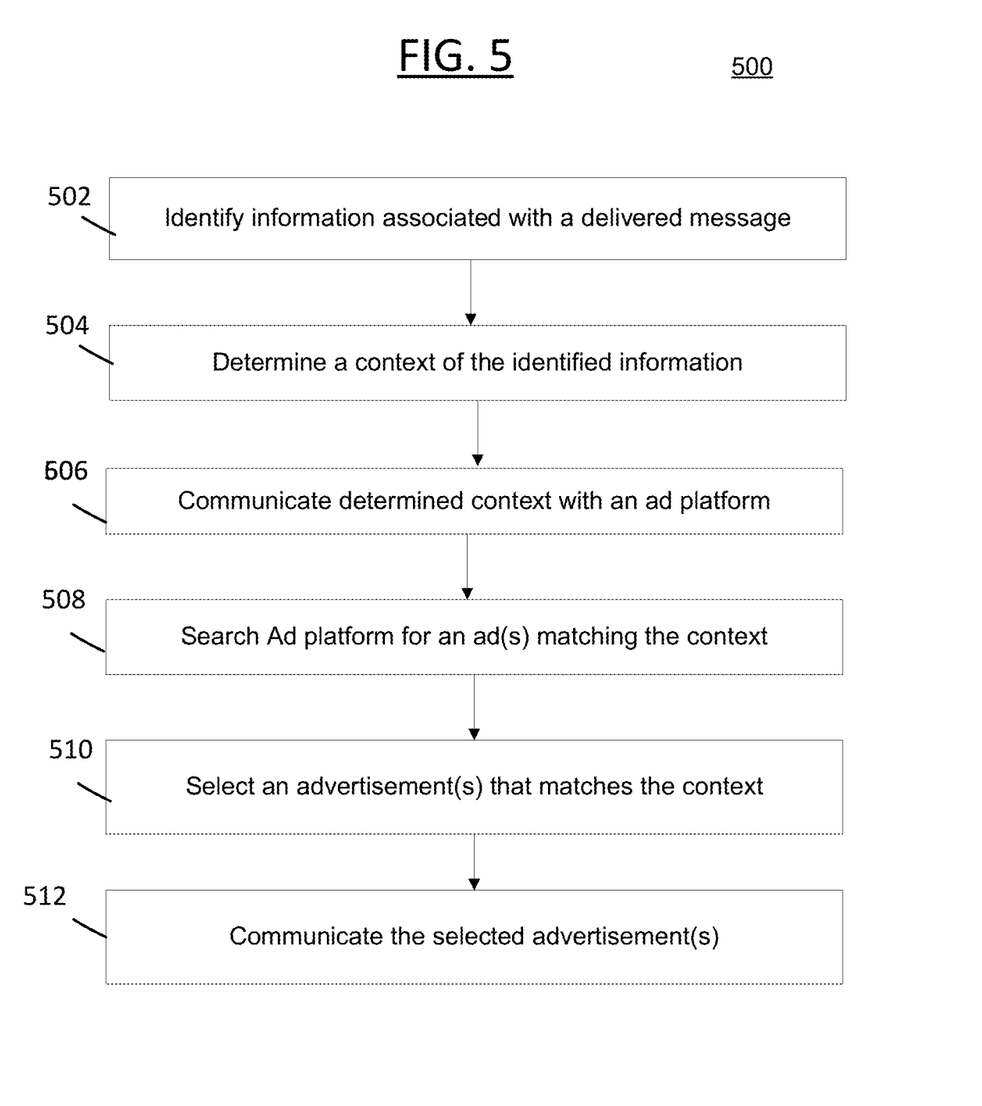
FIG. 5 is a block diagram illustrating an exemplary data flow in accordance with some embodiments of the present disclosure.

FIG. 5 is a work flow process 500 for serving related digital media content based on the information associated with a conditionally delivered message, as discussed above in relation to FIGS. 3-4. In some embodiments, the content can be associated with or comprising advertisements (e.g., digital advertisement content). Such content can include or be based upon, but is not limited to, information associated with an object a user received in his/her mailbox (e.g., a message or digital content included in a delivered message, for example), a context of a user's activity on a network that caused the delivery, and the like (e.g., how did the user interact with a message or message information, and/or some combination thereof). Such information can be referred to as "message information" for reference purposes only.

Process 500 discusses embodiments for engine 300 to provide functionality for mail systems to partner with third party entities enabling the entities to provide digital content for display within an inbox of a user based on the message information determined, discovered, derived or otherwise identified from Process 400, as discussed above.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 502, message information is identified. As discussed above, the message information can be based any of the information utilized, determined and/or generated from/during the mail pre-processing and delivery mechanisms outlined above with respect to FIGS. 3-4. For purposes of this disclosure, Process 500 will refer to single delivered message; however, it should not be construed as limiting, as any number of messages used can form such basis, without departing from the scope of the instant disclosure.

In Step 504, a context is determined based on the identified message information. This context forms a basis for serving content related to the message information. In some embodiments, the context can be in accordance with whether a user interacted with the delivered message.

For example, on Monday, a user is sent a message an email from a local sports store for a promotion occurring this weekend. According to the discussion above in relation to FIG. 4, the message will be delivered to the user's inbox on Friday night (since the promotion is for the weekend—Saturday and Sunday). The context of the message, according to Step 504, is based on the store's information and the type of deal being offered. Therefore, the context identified in Step 504 can be related to "sports gear". This context can be leveraged in order to identify digital content related to additional deals for the user at the local sports store, or at its competitors.

In some embodiments, the identification of the context from Step 504 can occur before, during and/or after the analysis detailed above with respect to Process 400, or it can be a separate process altogether, or some combination thereof.

In Step 506, the determined context is communicated (or shared) with a content providing platform comprising a server and database (e.g., content server 106 and content database 107, and/or advertisement server 130 and ad database). Upon receipt of the context, the server performs (e.g., is caused to perform as per instructions received from the device executing the engine 300) a search for a relevant digital content within the associated database. The search for the content is based at least on the identified context.

In Step 508, the server searches the database for a digital content item(s) that matches the identified context. In Step 510, a content item is selected (or retrieved) based on the results of Step 508. In some embodiments, the selected content item can be modified to conform to attributes or capabilities of the page, interface, message, platform, application or method upon which the content item will be displayed, and/or to the application and/or device for which it will be displayed. In some embodiments, the selected content item is shared or communicated via the application the user is utilizing to view, render and/or interact with a message, text, media, content or object item. Step 512. In some embodiments, the selected content item is sent directly to a user computing device for display on the device and/or within the UI displayed on the device's display. In some embodiments, the selected content item is displayed within a portion of the interface or within an overlaying or pop-up interface associated with a rendering interface displayed on the device. In some embodiments, the selected content item can be displayed as part of a coupon/ad clipping, coupon/ad recommendation and/or coupon/ad summarization interface.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising the steps of:
   receiving, by a server, a message sent by a sender and addressed to an inbox of a recipient, said message comprising digital content and a temporal range set by said sender for delivery of the message;
   analyzing, via the server, the message, and based on said analysis, determining a context of the digital content, said context comprising information indicating a type of digital content included within the message;
   identifying, by the server, user data associated with the recipient, said user data comprising information indicating real-world and digital activity associated with the recipient;
   analyzing, via the server, said user data, said analysis comprising parsing said real-world and digital activity based on said determined context, and identifying a portion of said user data that corresponds to said determined context;
   determining, via the server, a delivery condition of the message based on said portion of user data;
   storing, via the server, the received message in an associated database;
   monitoring, via the server, activity of the recipient;
   determining, via the server, that said delivery condition is outside of the temporal range;
   modifying, via the server, the delivery condition to a latest possible date within the temporal range;
   determining, via the server, that the modified delivery condition is satisfied based on said monitoring;
   retrieving, via the server, said message from said database; and
   communicating, via the server, said message to the recipient in accordance with the delivery condition.

2. The method of claim 1, further comprising:
   performing syntactic analysis of the type of content, said syntactic analysis causing the type of content to be identified as an individual component of the message.

3. The method of claim 2, further comprising:
   analyzing said component, and based on said analysis, determining said context as being referenced by the component.

4. The method of claim 1, further comprising:
   analyzing said message, and based on said analysis, identifying an indicator indicating that said sender is requesting the server deliver the message according to a server applied delivery condition.

5. The method of claim 1, wherein said user data comprises historical and real-time data of the recipient.

6. The method of claim 1, further comprising:
   charging the sender a premium, said charging being based on said communication occurring based on said delivery condition.

7. The method of claim 1, wherein said sender is associated with a subscription service.

8. The method of claim 7, further comprising:
   receiving, from the recipient, a request to sign up for the subscription service provided by the sender.

9. The method of claim 1, further comprising:
   causing communication, over the network, of information related to said delivered message to a third party platform to obtain a digital content item comprising third party provided digital content associated with said information;
   receiving, over the network, said digital content item; and
   communicating said digital content item to said user for display in association with the delivered message.

10. A non-transitory computer-readable storage medium tangibly encoded with computer-executable instructions, that when executed by a processor associated with a server, performs a method comprising the steps of:
    receiving, by the server, a message sent by a sender and addressed to an inbox of a recipient, said message comprising digital content and a temporal range set by said sender for delivery of the message;
    analyzing, via the server, the message, and based on said analysis, determining a context of the digital content, said context comprising information indicating a type of digital content included within the message;
    identifying, by the server, user data associated with the recipient, said user data comprising information indicating real-world and digital activity associated with the recipient;
    analyzing, via the server, said user data, said analysis comprising parsing said real-world and digital activity based on said determined context, and identifying a portion of said user data that corresponds to said determined context;
    determining, via the server, a delivery condition of the message based on said portion of user data;
    storing, via the server, the received message in an associated database;
    monitoring, via the server, activity of the recipient;
    determining, via the server, that said delivery condition is outside of the temporal range;
    modifying, via the server, the delivery condition to a latest possible date within the temporal range;
    determining, via the server, that the modified delivery condition is satisfied based on said monitoring;
    retrieving, via the server, said message from said database; and
    communicating, via the server, said message to the recipient in accordance with the delivery condition.

11. The non-transitory computer-readable storage medium of claim 10, wherein said determination of the context further comprises:
    performing syntactic analysis of the type of content, said syntactic analysis causing the type of content to be identified as an individual component of the message; and
    analyzing said component, and based on said analysis, determining said context as being referenced by the component.

12. The non-transitory computer-readable storage medium of claim 10, further comprising:
    analyzing said message, and based on said analysis, identifying an indicator indicating that said sender is requesting the server deliver the message according to a server applied delivery condition.

13. A messaging server comprising:
    a processor; and
    a non-transitory computer-readable storage medium for tangibly storing thereon program logic for execution by the processor, the program logic comprising:
    logic executed by the processor for receiving, by the server, a message sent by a sender and addressed to an inbox of a recipient, said message comprising digital content and a temporal range set by said sender for delivery of the message;

logic executed by the processor for analyzing, via the server, the message, and based on said analysis, determining a context of the digital content, said context comprising information indicating a type of digital content included within the message;

logic executed by the processor for identifying, by the server, user data associated with the recipient, said user data comprising information indicating real-world and digital activity associated with the recipient;

logic executed by the processor for analyzing, via the server, said user data, said analysis comprising parsing said real-world and digital activity based on said determined context, and identifying a portion of said user data that corresponds to said determined context;

logic executed by the processor for determining, via the server, a delivery condition of the message based on said portion of user data;

logic executed by the processor for storing, via the server, the received message in an associated database;

logic executed by the processor for monitoring, via the server, activity of the recipient;

logic executed by the processor for determining, via the server, that said delivery condition is outside of the temporal range;

logic executed by the processor for modifying, via the server, the delivery condition to a latest possible date within the temporal range;

logic executed by the processor for determining, via the server, that the modified delivery condition is satisfied based on said monitoring;

logic executed by the processor for retrieving, via the server, said message from said database; and logic executed by the processor for communicating, via the server, said message to the recipient in accordance with the delivery condition.

\* \* \* \* \*